(12) United States Patent
Grubert et al.

(10) Patent No.: US 10,226,754 B2
(45) Date of Patent: Mar. 12, 2019

(54) LEAN NO$_x$ TRAP WITH ENHANCED HIGH AND LOW TEMPERATURE PERFORMANCE

(71) Applicant: BASF Corporation, Florham Park, NJ (US)

(72) Inventors: Gerd Grubert, Hannover (DE); Torsten Neubauer, Langenhagen (DE); Alfred Punke, Walle (DE); Marcus Hilgendorff, Hannover (DE); Marko Buchholz, Marklohe (DE); Matthew Caudle, Hamilton, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/555,142

(22) PCT Filed: Mar. 3, 2016

(86) PCT No.: PCT/US2016/020607
§ 371 (c)(1),
(2) Date: Sep. 1, 2017

(87) PCT Pub. No.: WO2016/141142
PCT Pub. Date: Sep. 9, 2016

(65) Prior Publication Data
US 2018/0043336 A1 Feb. 15, 2018

Related U.S. Application Data

(60) Provisional application No. 62/127,437, filed on Mar. 3, 2015.

(51) Int. Cl.
*B01D 53/94* (2006.01)
*B01J 23/10* (2006.01)
(Continued)

(52) U.S. Cl.
CPC ........ *B01J 23/464* (2013.01); *B01D 53/9418* (2013.01); *B01D 53/9422* (2013.01); *B01J 21/04* (2013.01); *B01J 23/10* (2013.01); *B01J 23/63* (2013.01); *B01J 35/0006* (2013.01); *B01J 35/04* (2013.01); *B01J 37/0036* (2013.01); *B01J 37/0201* (2013.01); *B01J 37/0236* (2013.01); *B01J 37/0244* (2013.01); *B01J 37/0248* (2013.01); *B01J 37/038* (2013.01); *B01J 37/08* (2013.01); *B01D 2255/1021* (2013.01); *B01D 2255/1023* (2013.01); *B01D 2255/1025* (2013.01); *B01D 2255/2042* (2013.01); *B01D 2255/2047* (2013.01); *B01D 2255/2065* (2013.01); *B01D 2255/2092* (2013.01); *B01D 2255/20715* (2013.01);
(Continued)

(58) Field of Classification Search
CPC ............ B01D 2255/91; B01D 53/9422; B01D 53/9418; B01D 2255/1021; B01D 2255/1023; B01D 2255/1025; B01D 2255/2042; B01D 2255/2065; B01D 2255/2092; B01D 2255/904; B01D 2255/2047; B01D 2255/20715; B01J 23/464; B01J 23/10; B01J 35/0006; B01J 37/0248; B01J 37/0236; B01J 37/08; B01J 37/0244; F01N 3/0814; F01N 3/0842; F01N 3/2066
See application file for complete search history.

(56) References Cited

U.S. PATENT DOCUMENTS 5,750,082 A * 5/1998 Hepburn ............ B01D 53/9422
423/213.5
7,517,510 B2 4/2009 Chen et al.
(Continued)

FOREIGN PATENT DOCUMENTS

CN 107530623 A * 1/2018 ......... B01D 53/9422
DE 10 2012 20452 10/2012
(Continued)

OTHER PUBLICATIONS

International Search Report and Written Opinion dated May 17, 2016 in PCT/US2016/020607 filed Mar. 3, 2016.
(Continued)

*Primary Examiner* — Timothy C Vanoy
(74) *Attorney, Agent, or Firm* — Oblon, McClelland, Maier & Neustadt LLP (57) ABSTRACT

A lean NO$_x$ trap composition for the treatment of exhaust gas emissions, such as the oxidation of unburned hydrocarbons (HC), and carbon monoxide (CO), and the trapping and reduction of nitrogen oxides (NO$_x$) is disclosed. The lean NO$_x$ trap composition can have a washcoat layer on a carrier substrate including a first support material comprising greater than 50% by weight of a reducible metal oxide; 10 to 30% by weight of alkaline earth metal supported on a second support material comprising a refractory metal oxide and 50% or less by weight of a reducible metal oxide; and a platinum group metal component supported on at least one of the first support material and/or the second support material. A portion of the first support material may further include 0.5% to 10% by weight of an alkaline earth metal.

48 Claims, 1 Drawing Sheet

(51) Int. Cl.
*B01J 23/46* (2006.01)
*B01J 35/00* (2006.01)
*B01J 37/02* (2006.01)
*B01J 37/08* (2006.01)
*B01J 37/03* (2006.01)
*B01J 21/04* (2006.01)
*B01J 23/63* (2006.01)
*B01J 35/04* (2006.01)
*B01J 37/00* (2006.01)
*F01N 3/08* (2006.01)
*F01N 3/20* (2006.01)

(52) U.S. Cl.
CPC ......... *B01D 2255/904* (2013.01); *B01D 2255/9022* (2013.01); *B01D 2255/9025* (2013.01); *B01D 2255/91* (2013.01); *B01D 2257/404* (2013.01); *B01D 2258/012* (2013.01); *F01N 3/0814* (2013.01); *F01N 3/0842* (2013.01); *F01N 3/2066* (2013.01); *F01N 2330/30* (2013.01); *Y02C 20/10* (2013.01)

(56) References Cited

U.S. PATENT DOCUMENTS

| | | | |
|---|---|---|---|
| 9,540,980 B2* | 1/2017 | Hilgendorff | B01D 53/9422 |
| 9,662,638 B2* | 5/2017 | Hoyer | B01J 37/0244 |
| 9,744,529 B2* | 8/2017 | Xue | B01J 35/0006 |
| 2002/0031452 A1 | 3/2002 | Okamoto et al. | |
| 2013/0177484 A1 | 7/2013 | Naito et al. | |
| 2014/0161695 A1 | 6/2014 | Hilgendorff et al. | |
| 2014/0248200 A1 | 9/2014 | Wan et al. | |
| 2015/0045212 A1* | 2/2015 | Saito | B01D 53/945 502/303 |
| 2015/0352495 A1* | 12/2015 | Hoyer | B01J 23/63 423/213.5 |
| 2017/0183995 A1* | 6/2017 | Utschig | F01N 3/0842 |
| 2017/0218809 A1* | 8/2017 | Hoyer | F01N 3/2066 |
| 2017/0314438 A1* | 11/2017 | Brown | F01N 3/0814 |
| 2017/0320048 A1* | 11/2017 | Xue | B01J 35/0006 |
| 2017/0356317 A1* | 12/2017 | Armitage | B01D 53/9422 |
| 2018/0029016 A1* | 2/2018 | Sung | B01J 23/6562 |

FOREIGN PATENT DOCUMENTS

| | | | | |
|---|---|---|---|---|
| EP | 3 180 107 A1 * | 6/2017 | ......... | F01N 3/2066 |
| GB | 2 551 267 A * | 12/2017 | | |
| JP | H08-281106 | 10/1996 | | |
| JP | 2004/033872 | 2/2004 | | |
| JP | 2012 232231 A * | 11/2012 | ......... | B01J 23/58 |
| JP | 2013 146693 | 8/2013 | | |
| WO | 2011/154913 A1 | 12/2011 | | |
| WO | 2012/085564 A1 | 6/2012 | | |
| WO | 2013/042080 A1 | 3/2013 | | |
| WO | WO 2013/151557 | 10/2013 | | |
| WO | WO 2014 128236 A1 * | 8/2014 | ......... | B01J 23/63 |
| WO | 2014/164876 A1 | 10/2014 | | |
| WO | 2014/201094 A1 | 12/2014 | | |
| WO | WO 2016 023928 A1 * | 2/2016 | ......... | F01N 3/2066 |

OTHER PUBLICATIONS

International Preliminary Report on Patentability and Written Opinion dated Sep. 14, 2017 in PCT/US2016/020607.

Supplementary European Search Report dated Sep. 18, 2018, in European patent application No. 16759470.4 (10 pages).

* cited by examiner

LEAN $NO_x$ TRAP WITH ENHANCED HIGH AND LOW TEMPERATURE PERFORMANCE

TECHNICAL FIELD

The present invention is directed to nitrogen oxide storage materials and systems and methods for their use. More particularly, the invention pertains to $NO_x$ storage materials having improved low temperature $NO_x$ storage and regeneration, as well as, improved aging stable $NO_x$ storage, and methods of using the materials. The nitrogen oxide storage materials may be part of a catalytic trap used to treat exhaust gas streams, especially those emanating from diesel engines.

BACKGROUND

Engines, including diesel engines, are being designed to operate under lean conditions as a fuel economy measure. Such future engines are referred to as "lean burn engines." That is, the ratio of air to fuel in the combustion mixtures supplied to such engines is maintained considerably above the stoichiometric ratio (e.g., at an air-to-fuel weight ratio of 18:1) so that the resulting exhaust gases are "lean," i.e., the exhaust gases are relatively high in oxygen content. Although lean-burn engines provide advanced fuel economy, they have the disadvantage that conventional three-way catalytic converters (TWC) are not effective for reducing $NO_x$ emissions from such engines because of excessive oxygen in the exhaust. Attempts to overcome this problem have included the use of a $NO_x$ trap. The exhaust of such engines are treated with a catalyst/$NO_x$ sorbent which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with hydrocarbon (HC), carbonmonoxide (CO), and/or hydrogen present in the exhaust.

Diesel engines provide better fuel economy than gasoline engines and normally operate 100% of the time under lean conditions, where the reduction of $NO_x$ is difficult due to the presence of excess oxygen. In this case, the catalyst/$NO_x$ sorbent is effective for storing $NO_x$. After the $NO_x$ storage mode, a transient rich condition must be utilized to release/reduce the stored $NO_x$ to nitrogen.

$NO_x$ storage (sorbent) components including alkaline earth metal oxides, such as oxides of Mg, Ca, Sr, and Ba, alkali metal oxides such as oxides of Li, Na, K, Rb, and Cs, and rare earth metal oxides such as oxides of Ce, La, Pr, and Nd in combination with platinum group metal catalysts such as platinum dispersed on an alumina support have been used in the purification of exhaust gas from an internal combustion engine. For $NO_x$ storage, barium oxide is usually preferred because it forms nitrates at lean engine operation and releases the nitrates relatively easily under rich conditions. However, catalysts that use barium oxide for $NO_x$ storage exhibit a problem in practical application, particularly when the catalysts are aged by exposure to high temperatures and lean operating conditions. After such exposure, such catalysts show a marked decrease in catalytic activity for $NO_x$ reduction, particularly at low temperature (200 to 350° C.) operating conditions.

In a reducing environment, a lean $NO_x$ trap (LNT) activates reactions by promoting a steam reforming reaction of hydrocarbons and a water gas shift (WGS) reaction to provide $H_2$ as a reductant to abate $NO_x$. The water gas shift reaction is a chemical reaction in which carbon monoxide reacts with water vapor to form carbon dioxide and hydrogen. The presence of ceria in an LNT catalyzes the WGS reaction, improving the LNT's resistance to $SO_2$ deactivation and stabilizing the PGM. $NO_x$ storage materials comprising barium ($BaCO_3$) fixed to ceria ($CeO_2$) have been reported, and these $NO_x$ materials have exhibited improved thermal aging properties. Ceria, however, suffers from severe sintering upon hydrothermal aging at high temperatures. The sintering not only causes a decrease in low temperature $NO_x$ capacity and WGS activity, but also results in the encapsulation of $BaCO_3$ and PGM by the bulk $CeO_2$. Lean $NO_x$ traps generate high $N_2O$ emissions when the LNT is placed in an underfloor position because $N_2O$ formation in the LNT increases with decreasing temperature. Placing the LNT closer to the engine can reduce $N_2O$ emissions, which requires high hydrothermal stability. Thus, there is a need for a ceria-containing LNT that is hydrothermally stable.

In addition, the new Diesel Euro6c legislation, scheduled to become effective in 2017, requires $NO_x$ conversions under real driving conditions. Thus, to comply with new Diesel Euro6c legislation, the LNT must store $NO_x$ under high (motorway) and low (city) temperature conditions. Additionally, the removal of the stored $NO_x$ and conversion to $N_2$ at low temperatures is a challenge. However, the LNT $DeNO_x$ regeneration of stored $NO_x$ under city driving conditions and the aging stability of $NO_x$ storage needs to be improved compared to existing LNT catalysts.

SUMMARY

A first embodiment of the present invention pertains to a lean NOx trap composition comprising a washcoat layer on a carrier substrate including a first support material comprising greater than 50% by weight of a reducible metal oxide; 10 to 30% by weight of alkaline earth metal supported on a second support material comprising a refractory metal oxide and 50% or less by weight of a reducible metal oxide; and a platinum group metal component supported on at least one of the first support material and the second support material.

In a second embodiment, the first embodiment can be modified such that a portion of the first support material further comprises 0.5% to 10% by weight of alkaline earth metal.

In a third embodiment, the first embodiment or second embodiment can be modified such that a portion of the first support material further comprises 3% to 6% by weight of alkaline earth metal.

In a fourth embodiment, any of the first through third embodiments can be modified such that the reducible metal oxide is one or more of $CeO_2$, $MnO_2$, $Mn_2O_3$, $Fe_2O_3$, $CuO$, or $CoO$ and mixtures thereof.

In a fifth embodiment, any of the first through fourth embodiments may be modified such that the first support material further comprises alumina.

In a sixth embodiment, any of the first through fifth embodiments may be modified such that the first support material further comprises one or more dopants selected from oxides of Y, Nd, Sm, La, Zr, Nb or Pr.

In a seventh embodiment, any of the first through sixth embodiments may be modified such that the alkaline earth metal is barium.

In an eighth embodiment, any of the first through seventh embodiments may be modified such that the first support material comprises 100% by weight ceria.

In a ninth embodiment, any of the first through eighth embodiments may be modified such that the second support material consists essentially of ceria and alumina.

In a tenth embodiment, any of the first through ninth embodiments may be modified such that the second support material comprises 20-50% by weight ceria and 50-80% by weight alumina.

In an eleventh embodiment, any of the first through tenth embodiments may be modified such that the ceria and alumina are present in a ratio of 30:70 of ceria to alumina.

In a twelfth embodiment, any of the first through tenth embodiments may be modified such that the ceria and alumina are present in a ratio of 50:50 of ceria to alumina.

In a thirteenth embodiment, any of the sixth through twelfth embodiments may be modified such that 1% to 7% by weight of barium oxide is supported on a portion of the first support.

In a fourteenth embodiment, any of the first through thirteenth embodiments may be modified such that the platinum group metal component includes one or more of Rh, Pt and Pd.

In a fifteenth embodiment, any of the first through fourteenth embodiments may be modified to further comprise a third support material comprising a refractory metal oxide and 50% or less by weight of a reducible metal oxide.

In a sixteenth embodiment, the fifteenth embodiment may be modified such that the refractory metal oxide is alumina.

In a seventeenth embodiment, any of the first through sixteenth embodiments may be modified such that wherein the platinum group metal component includes Pt and Pd.

In an eighteenth embodiment, either the fourteenth through seventeenth embodiments may be modified such that Pt is present in a range of 20 to 200 $g/ft^3$, Pd is present in a range of 1 to 50 $g/ft^3$, and the ratio of Pt to Pd is in the range of 15:1 to 2:1.

In a nineteenth embodiment, any of the fourteenth through eighteenth embodiments may be modified such that wherein the ratio of Pt to Pd is in the range of 10:1 to 4:1.

In a twentieth embodiment, any of the first through nineteenth embodiments may be modified such that 100% of the platinum group metal component is on the second support and the platinum group metal component comprises Pt and Pd.

In a twenty-first embodiment, any of the first through nineteenth embodiments may be modified such that the platinum group metal component comprises Pt and Pd, and wherein 50-100% by weight of the Pd is on the first support.

In a twenty-second embodiment, any of the first through nineteenth embodiments may be modified such that the platinum group metal component comprises Pt and Pd, and wherein 2-10% by weight of the Pt on the first support.

In a twenty-third embodiment, any of the first through twenty-second embodiments may be modified such that the platinum group metal component further comprises rhodium present in a range of 1 to 20 $g/ft^3$ on a portion of the first support.

In a twenty-fourth embodiment, any of the first through twenty-third embodiments may be modified such that the second support and the first support are present in a ratio of 1:3 to 4:1 of the second support to first support.

In a twenty-fifth embodiment, any of the first through twenty-fourth embodiments may be modified such that the second support and the first support are present in a ratio of 1:2 to 3:1 of the second support to first support.

In a twenty-sixth embodiment, any of the first through twenty-fifth embodiments may be modified such that the refractory metal oxide of the second support is doped with one or more of an oxide of Mg, Mn and Zr.

In a twenty-seventh embodiment, any of the first through twenty-sixth embodiments may be modified such that the refractory metal oxide is doped with an oxide of Mg and Zr.

In a twenty-eighth embodiment, any of the first through seventh embodiments may be modified such that the loading of the barium oxide and the second support is present in the range of 1 to 4 $g/in^3$.

In a twenty-ninth embodiment, any of the first through thirteenth embodiments may be modified such that the loading of the barium oxide and the first support is present in the range of 0.1 to 2 $g/in^3$.

A thirtieth embodiment pertains to an exhaust gas system for a lean burn internal combustion engine comprising the lean NOx trap composition of any of the first through twenty-ninth embodiments, modified such that the system further comprises a downstream selective catalytic reduction (SCR) catalyst.

In a thirty-first embodiment, the thirtieth embodiment may be modified such that the lean NOx trap composition is disposed as a washcoat on a substrate and the SCR catalyst is disposed as a separate washcoat layer on a separate downstream substrate.

In a thirty-second embodiment, any of the thirtieth or thirty-first embodiments may be modified such that lean NOx trap composition is on a honeycomb flow through substrate and the SCR catalyst is on a wall flow substrate.

In a thirty-third embodiment, any of the thirtieth or thirty-first embodiments may be modified such that lean NOx trap composition is on a wall flow substrate and the SCR catalyst is on a honeycomb flow through substrate.

A thirty-fourth embodiment pertains to a lean NOx trap composition comprising a washcoat layer on a carrier substrate including: a first support material comprising greater than 50% by weight of a reducible metal oxide; 10 to 20% by weight of alkaline earth metal supported on a second support material comprising a refractory metal oxide and 50% or less by weight of a reducible metal oxide; a platinum group metal component supported on a third support material comprising greater than 50% by weight of a reducible metal oxide; and a platinum group metal component supported on a fourth support material comprising a refractory metal oxide and 50% or less by weight of a reducible metal oxide.

In a thirty-fifth embodiment, the thirty-fourth embodiment can be modified such that a platinum group metal is present on a portion of the first support material.

In a thirty-sixth embodiment, the thirty-fourth and thirty-fifth embodiments can be modified such that the platinum group metal on a portion of the first support material is rhodium.

In a thirty-seventh embodiment, the thirty-sixth embodiment can be modified such that rhodium is present in a range of 1 to 20 $g/ft^3$.

In a thirty-eighth embodiment, the thirty-fourth through thirty-seventh embodiments can be modified such that the reducible metal oxide is one or more of $CeO_2$, $MnO_2$, $Mn_2O_3$, $Fe_2O_3$, $CuO$, or $CoO$ and mixtures thereof.

In a thirty-ninth embodiment, any of the thirty-fourth and thirty-eighth embodiments can be modified such that the first support material comprises 100% by weight ceria.

In a fortieth embodiment, any of the thirty-fourth through thirty-ninth embodiments can be modified such that the alkaline earth metal supported on the second support is barium oxide.

In a forty-first embodiment, any of the thirty-fourth through fortieth embodiments can be modified such that the platinum group metal component supported on the third support material is rhodium.

In a forty-second embodiment, the forty-first embodiment can be modified such that rhodium is present in a range of 1 to 20 g/ft$^3$.

In a forty-third embodiment, the forty-second embodiment can be modified such that rhodium is present in a range of 3 to 7 g/ft$^3$.

In a forty-fourth embodiment, any of the thirty-fourth through forty-third embodiments can be modified such that the third support comprises one or more of $CeO_2$, $Al_2O_3$, $ZrO_2$ and mixtures thereof.

In a forty-fifth embodiment, any of the thirty-fourth through forty-fourth embodiments can be modified such that the fourth support comprises one or more of $CeO_2$, $Al_2O_3$, $ZrO_2$ and mixtures thereof.

In a forty-sixth embodiment, any of the thirty-fourth through forty-fifth embodiments can be modified such that the platinum group metal component supported on the fourth support material comprises Pt and Pd.

In a forty-seventh embodiment, any of the thirty-first through forty-sixth embodiments can be modified such that the refractory metal oxide of the fourth support is doped with one or more of an oxide of Mg, Mn and Zr.

A forty-eighth embodiment pertains to a method of treating exhaust gas from a lean burn internal combustion engine, the method comprising contacting lean exhaust gas containing nitric oxide with the lean NOx trap composition according to any of the first through thirty-third embodiments, and intermittingly contacting the lean NOx trap composition with enriched exhaust gas.

A forty-ninth embodiment pertains to a method of treating exhaust gas from a lean burn internal combustion engine, the method comprising contacting lean exhaust gas containing nitric oxide with the lean NOx trap composition according to any of the thirty-fourth through forty-seventh embodiments, and intermittingly contacting the lean NOx trap composition with enriched exhaust gas.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

According to one or more embodiments of the invention, an LNT catalyst material is provided which exhibits improved hydrothermal stability, higher $NO_x$ trapping capacity, and higher $NO_x$ conversion than traditional LNT catalysts. In one or more embodiments, the LNT catalyst materials comprises a low temperature storage material comprising a first support material comprising greater than 50% by weight of a reducible metal oxide, and a high temperature storage material comprising a relatively high alkaline earth loading on a second support material comprising a refractory metal oxide and a reducible metal oxide present in an amount of 50% or less by weight.

According to one or more embodiments, the low temperature storage material further comprises a relatively low alkaline earth loading on a portion of the first support material. For improved low temperature $NO_x$ storage and regeneration, as well as aging stable $NO_x$ storage, a mixture of 5% BaO on 100% Ceria and 10-20% BaO on Ce/Al=50%/50% in a single slurry technology was identified as $NO_x$ storage material for the next generation of Euro6c LNTs. This materials show superior performance compared to the recent Euro6b LNTs containing mixtures of pure ceria and Ba on Ce/Al=90/10 support materials.

With respect to the terms used in this disclosure, the following definitions are provided.

Reference to a "support" in a catalyst washcoat layer refers to a material that receives platinum group metals, stabilizers, promoters, binders, and the like through association, dispersion, impregnation, or other suitable methods. Useful high-surface area supports include one or more refractory oxides. These oxides include, for example, alumina-ceria, silica and alumina, titania and zirconia include mixed oxide forms such as silica-alumina, aluminosilicates which may be amorphous or crystalline, alumina-zirconia, and the like and titanium-alumina and zirconium-silicate.

As used herein, the term "alkaline earth metal" refers to one or more chemical elements defined in the Periodic Table of Elements, including beryllium (Be), magnesium (Mg), calcium (Ca), strontium (Sr), barium (Ba), and radium (Ra). In one or more embodiments, the alkaline earth metal component comprises a barium component. The alkaline earth metal component can be present in the washcoat in an amount in the range of about 0.5% to 40% by weight on an oxide basis. In a specific embodiment, the alkaline earth metal component comprises a barium component, which is present in an amount in the range of about 0.5% to about 40% by weight on an oxide basis.

In one or more embodiments, the LNT or nitrogen oxide storage catalyst can further comprise at least one platinum group metal. As used herein, the term "platinum group metal" or "PGM" refers to one or more chemical elements defined in the Periodic Table of Elements, including platinum, palladium, rhodium, osmium, iridium, and ruthenium, and mixtures thereof. In one or more embodiments, the platinum group metal is selected from the group consisting of platinum, palladium, rhodium, iridium, and mixtures thereof. In a specific embodiment, the platinum group metal is selected from platinum, palladium, rhodium, and mixtures thereof.

Embodiments of a first aspect of the invention are directed to a lean $NO_x$ trap composition. In one or more embodiments, the lean $NO_x$ trap composition comprises a washcoat layer on a carrier substrate having a first support material comprising greater than 50% by weight of a reducible metal oxide; 10 to 30% by weight of alkaline earth metal supported on a second support material comprising a refractory metal oxide and 50% or less by weight of a reducible metal oxide; and a platinum group metal component supported on at least one of the first support material and the second support material. In one or more embodiments, the lean $NO_x$ trap composition further comprises a washcoat layer on a carrier substrate having 0.5% to 10% by weight of alkaline earth metal supported on a portion of the first support material. In a specific embodiment, 3% to 6% by weight of alkaline earth metal is supported on a portion of the first support material. The lean $NO_x$ trap composition is effective to store $NO_x$ and thermally desorb the stored $NO_x$ at temperatures above 300°. In one or more embodiments, the reducible metal oxide is $CeO_2$, $MnO_2$, $Mn_2O_3$, $Fe_2O_3$, CuO, or CoO.

In one or more specific embodiments, the first support material comprises greater than 50% by weight ceria. In one or more specific embodiments, the first support material comprises 100% by weight ceria. In one or more very specific embodiments, the first support is doped with one or more of an oxide of Zr, Nb, La and Pr. In one or more embodiments, first support material can also include alumina and dopants including, but not limited to, an oxide of Y, Nd, Sm, Zr, La, Nb, Pr.

In specific embodiments, the second support material comprises 20-50% by weight ceria. In one or more very specific embodiments, the second support material comprises 50% or less by weight ceria and 10 to 30% by weight of alkaline earth metal is supported on a second support material comprising a reducible metal oxide and a refractory metal oxide. In one or more embodiments, the second support material consists essentially of ceria and alumina. In one or more specific embodiments, the second support material comprises 50-80% by weight alumina and 20-50% by weigh ceria. In one or more embodiments, ceria and alumina are present in a ratio of 30:70 of ceria to alumina. In one or more specific embodiments, ceria and alumina are present in a ratio of 50:50 of ceria to alumina. In one or more specific embodiments, the refractory metal oxide on the second support is doped with one or more of an oxide of Mg, Mn and Zr. In one or more very specific embodiments, the refractory metal oxide is doped with one or more of an oxide of Mg and Zr.

In one or more embodiments, the second support and the first support are present in a ratio of 1:2 to 4:1 of the second support to first support. In one or more specific embodiments, the second support and the first support are present in a ratio of 1:1 to 3:1 of the second support to first support.

In one or more embodiments, a third support material is present which may have the same or different composition as the second support material. In one or more embodiments, the third support material may comprise a refractory metal oxide and 50% or less by weight of a reducible metal oxide. In a specific embodiment, the third support material may comprise 100% $Al_2O_3$.

In one or more embodiments, the alkaline earth metal is barium oxide. In very specific embodiments, 1% to 7% by weight of barium oxide is supported on a portion of the first support. In very specific embodiments, the loading of the barium oxide and the first support is present in the range of 0.1-2 $g/in^3$. In other very specific embodiments, the loading of the barium oxide and the second support is present in the range of 1 to 4 $g/in^3$.

The platinum group metal can be selected from the group consisting of platinum, palladium, rhodium, iridium, and mixtures thereof. In a specific embodiment, the platinum group metal is selected from platinum, palladium, and mixtures thereof. In a more specific embodiment, the platinum group metal is selected from platinum, palladium, rhodium, and mixtures thereof. In one or more embodiments, the platinum group metal component includes one or more of Pt and Pd. In one or more specific embodiments, the platinum group metal component includes Pt and Pd. In very specific embodiments, Pt is present in a range of 20 to 200 $g/ft^3$, Pd is present in a range of 1 to 50 $g/ft^3$ and the ratio of Pt to Pd is in the range of 15:1 to 2:1. In one or more specific embodiments, the ratio of Pt to Pd is in the range of 10:1 to 4:1. In very specific embodiments, 100% of the platinum group metal component is on the second support and the platinum group metal component comprises Pt and Pd. In other very specific embodiments, the platinum group metal component comprises Pt and Pd wherein 50-100% by weight of the Pd is on the first support. In other specific embodiments, the platinum group metal component comprises Pt and Pd, and wherein 2-10% by weight of the Pt on the first support. In one or more embodiments, the platinum group metal component further comprises rhodium present in a range of 1 to 20 $g/ft^3$. In one or more embodiments, rhodium is present on a portion of the first support material. In a specific embodiment wherein an alkaline earth metal and rhodium are both supported on a portion of the first support, 30-60% of the first support material supports rhodium and 40-70% of the first support material supports an alkaline earth metal, for example, barium oxide. In one or more embodiments that include rhodium, the rhodium is on a third support material, which can be a refractory metal oxide as described above. In one or more embodiments, the first support material and second support material further comprise at least one platinum group metal supported on the ceria-alumina particles.

In yet another embodiment, the lean $NO_x$ trap composition comprises a washcoat layer on a carrier substrate having a first support material comprising greater than 50% by weight of a reducible metal oxide; 10 to 20% by weight of alkaline earth metal supported on a second support material comprising a refractory metal oxide and 50% or less by weight of a reducible metal oxide; a third support material comprising a platinum group metal component on a reducible metal oxide; and fourth support material comprising a platinum group metal component supported on a refractory metal oxide and 50% or less by weight of a reducible metal oxide.

In one or more embodiments, the reducible metal oxide is $CeO_2$, $MnO_2$, $Mn_2O_3$, $Fe_2O_3$, $CuO$, $CoO$ and mixtures thereof. In one or more specific embodiments, the first support material comprises greater than 50% by weight ceria. In one or more specific embodiments, the first support material comprises 100% by weight ceria.

In one or more embodiments, a portion of the first support may further comprise a platinum group metal. In a specific embodiment, the platinum group metal on the first support is rhodium and the reducible metal oxide of the first support is one or more of $CeO_2$, $MnO_2$, $Mn_2O_3$, $Fe_2O_3$, $CuO$, $CoO$ and mixtures thereof and mixtures thereof. In another very specific embodiment, the first support material comprises rhodium supported on pure ceria particles. In very specific embodiments, Rh is present in a range of 1 to 20 $g/ft^3$ on a portion of the first support. In another very specific embodiment, Rh is present in a range of 3 to 7 $g/ft^3$ on a portion of the first support.

In one or more embodiments, the alkaline earth metal is barium oxide. In one or more embodiments, the refractory metal oxide of the second support comprises alumina-ceria.

In one or more embodiments, the second support material may have the same or different composition as the fourth support material. In one or more embodiments, the fourth support material may comprise a refractory metal oxide and 50% or less by weight of a reducible metal oxide. In a specific embodiment, the refractory metal oxide is 100% $Al_2O_3$.

In very specific embodiments, the second support material comprises 10% to 20% by weight of barium oxide supported on ceria-alumina particles. In one or more specific embodiments, the second support material comprises 10-20% by weight barium oxide, 40-45% by weight alumina and 40-45% by weight ceria.

The platinum group metal can be selected from the group consisting of platinum, palladium, rhodium, iridium, and mixtures thereof. In a specific embodiment, the platinum group metal is selected from platinum, palladium, rhodium, and mixtures thereof. In one or more embodiments, the platinum group metal component includes one or more of Pt, Pd and Rh.

In a very specific embodiment, the platinum group metal of the third support is rhodium and the third support comprises one or more of $Al_2O_3$ and $ZrO_2$, and wherein the reducible metal oxide is one or more of $CeO_2$, $MnO_2$, $Mn_2O_3$, $Fe_2O_3$, CuO, or CoO and mixtures thereof. In another very specific embodiment, the third support material comprises rhodium supported on pure ceria particles. In very specific embodiments, Rh is present in a range of 1 to 20 g/ft$^3$ on a third support. In another very specific embodiment, Rh is present in a range of 3 to 7 g/ft$^3$ on a third support.

In one or more embodiments, a platinum group metal component is supported on a fourth support material, the fourth support material comprising a refractory metal oxide and 50% or less by weight of a reducible metal oxide. In one or more embodiments, the fourth support comprises one or more of $Al_2O_3$ and $ZrO_2$, and wherein the reducible metal oxide is one or more of $CeO_2$, $MnO_2$, $Mn_2O_3$, $Fe_2O_3$, CuO, or CoO and mixtures thereof. In one or more very specific embodiments, the fourth support comprises one or more of rhodium, platinum and palladium supported on alumina ($Al_2O_3$). In very specific embodiments, Pt is present in a range of 20 to 200 g/ft$^3$ on a fourth support, and Pd is present in a range of 1 to 50 g/ft$^3$ on a fourth support.

In another very specific embodiment, the refractory metal oxide of the fourth support comprises alumina and 50% or less by weight of a reducible metal oxide. In one or more very specific embodiments, the fourth support is doped with one or more of an oxide of Mg. Mn and Zr.

Typically, the lean $NO_x$ trap composition of the present invention is disposed on a substrate. The substrate may be any of those materials typically used for preparing catalysts, and will typically comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. In one or more embodiments, the monolithic substrate may comprise a honeycomb cell structure with a length, a cross-sectional area, an inlet end and an outlet end, and an amount of LNT loaded on the cell walls. In various embodiments, the cell walls may be porous thereby forming a wall-flow substrate and/or particulate filter. It should be understood that the term "monolithic substrate" is intended to encompass both flow-through and wall-flow (e.g., diesel particulate filters (DPF), a gasoline particulate filter (GPF), particle oxidation catalyst (POC), a catalyzed soot filter (CSF), etc.) substrate types, where the monolithic substrate provides surfaces that can support one or more washcoat layers and/or catalytic materials. The term "monolithic substrate" is therefore used throughout the application for simplicity and convenience without intending to narrow the scope of the claimed invention.

Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The cells can have cross sections that are rectangular, square, circular, oval, triangular, hexagonal, or are of other polygonal shapes. The ceramic substrate may be made of any suitable refractory material, e.g., cordierite, cordierite-alumina, silicon nitride, or silicon carbide, or the substrates may be composed of one or more metals or metal alloys.

The lean $NO_x$ trap washcoat compositions according to embodiments of the present invention can be applied to the substrate surfaces by any known means in the art. For example, the catalyst washcoat can be applied by spray coating, powder coating, or brushing or dipping a surface into the catalyst composition.

Another aspect of the invention pertains to an emission treatment system using an LNT described according to any of the embodiments above. The LNT of the present invention can be used in an integrated emission treatment system comprising one or more additional components for the treatment of exhaust gas emissions. For example, the emission treatment system may comprise a lean burn engine upstream from the nitrogen oxide storage catalyst of one or more embodiments, and may further comprise a catalyst and, optionally, a particulate filter. In one or more embodiments, the catalyst is selected from a three-way catalyst (TWC), a diesel oxidation catalyst, and an SCR catalyst. In one or more embodiments, the particulate filter can be selected from a gasoline particulate filter, a soot filter, or a SCROF. The particulate filter may be catalyzed for specific functions. The LNT can be located upstream or downstream of the particulate filter.

In one or more embodiments, the emission treatment system may comprise a lean burn engine upstream from the nitrogen oxide storage catalyst of one or more embodiments, and may further comprise a TWC. In one or more embodiments, the emission treatment system can further comprise an SCR/LNT.

In a specific embodiment, the particulate filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. In one or more embodiments, the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Comparison to Prior Art LNT

As shown below in Table 1, LNT A is referred to as Sample 1.1 and represents a sample of a comparative prior art LNT. LNT B is referred to as Sample 1.2 and represents a sample of an LNT of the present invention.

TABLE 1

| Sample No. | Catalyst | PGM loading/ g/ft$^3$ (Pt/Pd/Rh) | Low T storage material | High T storage Material |
|---|---|---|---|---|
| 1.1 | LNT A | 150 (130/15/5) | Ceria | 20% Ba on 13% Ce/alumina |
| 1.2 | LNT B | 150 (130/15/5) | 5% Ba on Ceria | 17% Ba on 50ceria/ 50% alumina |

Substrates 4.5*5.4" 300/600 metal substrate

Sample 1.1 Prior Art LNT

To prepare the first (bottom) layer of Sample 1.1, 2.45 g/in$^3$ of a Ba/Ce/Alumina (20/13/67) material was firstly impregnated with a platinum solution with platinum as an amine stabilized hydroxo Pt IV complex to give a dry content of Pt 130 g/ft$^3$ and secondly with an aqueous solution of palladium nitrate giving a final dry Pd content of 15 g/ft$^3$. The resulting powder with a solid content of 65-70% was dispersed in water.

Pure 100% ceria (2.45 g/in$^3$), magnesium acetate 4 hydrate (0.3 g/in$^3$) and zirconium acetate (0.05 g/in$^3$) were added to the Pt/Pd/Ba/Ce/alumina slurry. The subsequent slurry was milled to a particle size d90 of 9 µm. The final slurry is subsequently coated onto a metallic flow through substrate. The coated substrate is dried at 110° C. air and calcined at 590° C. in air. To prepare the second (top) layer of Sample 1.1, 0.7 g/in$^3$ of high porous γ-alumina material was firstly impregnated with a platinum solution with platinum as an amine stabilized hydroxo Pt IV complex to give a dry content of Pt 40 g/ft$^3$. The resulting powder with a solid content of 55-60% was dispersed in water.

For Rh impregnation, 100% ceria material (0.5 g/in$^3$) was dispersed into water to a solid content of 43%. A solution of Rh nitrate was added to the ceria slurry giving a final dry Rh content of 5 g/ft$^3$.

The resulting Rh/ceria slurry was added to the Pt/Pd/ alumina slurry. The subsequent slurry was milled to a particle size d90 of 8 µm. The final slurry is subsequently coated onto a metallic flow through substrate. The coated substrate is dried at 110° C. air and calcined at 590° C. in air.

Sample 1.2 LNT

To prepare Sample 1.2, an embodiment of the present invention, 1.41 g/in$^3$ of 50%/50% ceria/alumina material was impregnated with an aqueous solution of BaOAC (0.29 g/in$^3$). The resulting powder was calcined at 590° C. for 2 hours resulting in a Ba/Ceria material with 17% BaO content.

1 g/in$^3$ high porous γ-alumina was firstly impregnated with a platinum solution with platinum as an amine stabilized hydroxo Pt IV complex to give a dry content of Pt 130 g/ft$^3$ and secondly with an aqueous solution of Palladium nitrate giving a final dry Pd content of 15 g/ft$^3$. The resulting powder with a solid contend of 55-65% was dispersed in water.

For Rh impregnation, pure 100% ceria material (0.4 g/in$^3$) was dispersed into water to a solid content of 43%. A solution of Rh nitrate was added to the ceria slurry giving a final dry Rh content of 5 g/ft$^3$.

For the Ba impregnation on ceria (1.995 g/in$^3$), pure 100% ceria material was impregnated with an aqueous solution of BaOAc (0.105 g/in$^3$). The resulting powder was calcined at 590° C. for 2 hours resulting in a Ba/Ceria material with 5% BaO content.

The resulting Rh/Ceria slurry, Ba/Ceria material (2.1 g/in$^3$), Ba/Ce/Al material (1.7 g/in$^3$), magnesium acetate 4 hydrate (0.3 g/in$^3$) and zirconium acetate (0.05 g/in$^3$) were added to the Pt/Pd/alumina slurry. The subsequent slurry was milled to a particle size d90 of 9 µm. The final slurry is subsequently coated onto a metallic flow through substrate. The coated substrate is dried at 110° C. air and calcined at 590° C. in air.

New European Driving Cycle (NEDC) CO and HC Performance Evaluation

Samples 1.1 and 1.2 were evaluated with 3 standard New European Driving Cycles (NEDC) on an engine test cell equipped with a Euro 6 2 L engine. Prior to testing, the samples were aged for 16 hours at 800° C. under air flow with 10% water vapor. A rich engine mode was applied at 1075 s point in the NEDC for 7 s at Lambda 0.95 to regenerate the LNT from stored NOx. The NOx, CO and HC conversions over Samples 1.1 and 1.2 were measured. The average temperature over the first 4 ECE cycles was 120° C. Higher conversions characterize a better gas activity. The NOx, CO and HC performance of the inventive LNT (Sample 1.2) is significantly higher compared to the prior art LNT (Sample 1.1), as shown in Table 2.

TABLE 2

NEDC Engine out emissions and conversion of the 3$^{rd}$ test cycle; Emissions up-stream catalyst system: NOx = 0.16 g/km; CO = 1.5 g/km; HC = 0.210 g/km)

| Sample | NOx Conversion/% | CO Conversion/% | HC Conversion/% |
|---|---|---|---|
| 1.1 LNT A | 40 | 77 | 71 |
| 1.2 LNT B | 54 | 87 | 78 |

Lean/Rich Cycle Test for DeNOx Performance Evaluation

Figure 1:
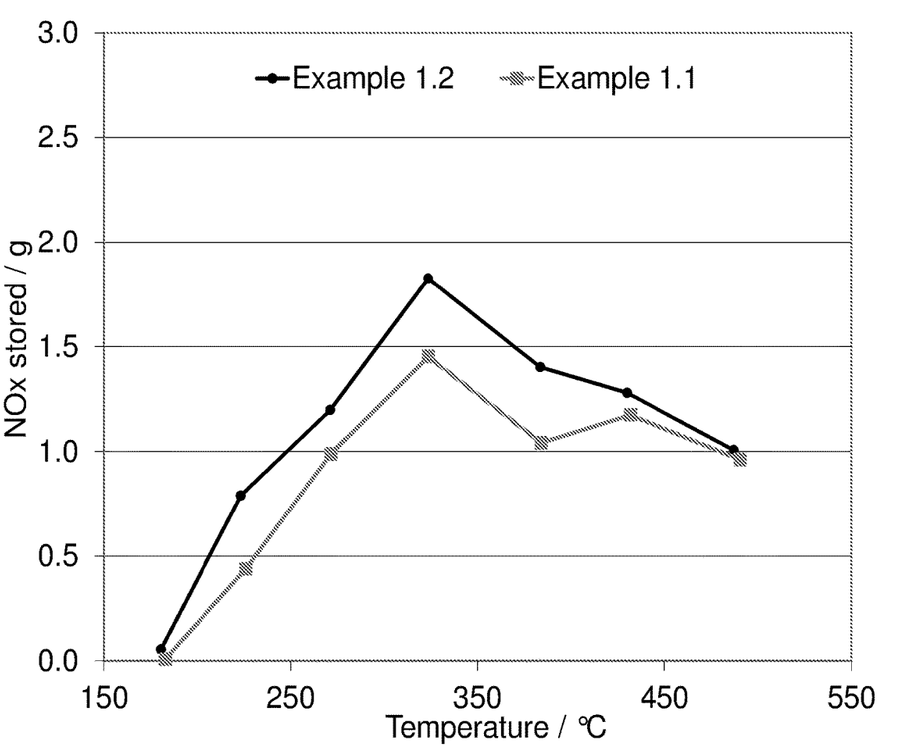
FIG. 1 is a graphical depiction of the comparison of the NOx storage between samples of an LNT of the present invention and a prior art LNT in a lean/rich cycle test.

For DeNOx performance evaluation a lean/rich cycle test was used. The lean/rich cycle test is an engine test consisting of seven lean/rich cycles conducted at 7 different pre catalyst temperatures from 190° C. to 500° C. For each temperature at the start of the test, a rich operation of 30 seconds is conducted to assure all nitrates are desorbed from the LNT. In the lean phase NOx from the engine out is stored on the LNT catalyst. After the lean phase, the engine goes into a rich mode for 10-15 second. During the rich mode, most of the stored NOx on the catalyst is converted to nitrogen. The NOx storage in the last 5 cycle is monitored and evaluated. FIG. 1 shows the NOx storage in the 7th cycle of 16 h hydrothermally oven aged of Samples 1.1 and 1.2. The inventive LNT (Sample 1.2) shows significantly higher NOx storage compared to the prior art LNT (Sample 1.1) which has no Ba on ceria for low temperature NOx storage as well as Ba on 13% Ce/alumina material as high temperature NOx storage material.

Low T/High T Material Ratio

As shown below in Table 3, LNT C is referred to as Sample 1.3 and represents a sample of a prior art LNT. LNTs D-G are referred to as Samples 1.4-1.7, respectively and represent different samples of LNTs of the present invention.

TABLE 3

| Sample No. | Catalyst | PGM loading/ g/ft³ (Pt/Pd/Rh) | Low T storage material | High T storage Material | Low T/High T material ratio |
|---|---|---|---|---|---|
| 1.3 | LNT C | 85 (72/8/5) | Ceria | 20% Ba on 13% Ce/ alumina | 0.76 |
| 1.4 | LNT D | 85 (72/8/5) | Ba on Ceria | Ba on 50% ceria/ 50% alumina | 0.62 |
| 1.5 | LNT E | 85 (72/8/5) | Ceria | Ba on 50% ceria/ 50% alumina | 0.62 |
| 1.6 | LNT F | 85 (72/8/5) | Ba on Ceria | Ba on 50% ceria/ 50% alumina | 0.36 |
| 1.7 | LNT G | 85 (72/8/5) | Ba on Ceria | Ba on 50% ceria/ 50% alumina | 1.00 |

Ceramic substrates 5.66*4.5" 400/4

Sample 1.3 Prior Art LNT (Comparative)

To prepare the first (bottom) layer of Sample 1.3, 3 g/in³ of a Ba/Ce/Alumina (20/13/67) was firstly impregnated with a platinum solution with platinum as an amine stabilized hydroxo Pt IV complex to give a dry content of Pt 72 g/ft³ and secondly with an aqueous solution of palladium nitrate giving a final dry Pd content of 8 g/ft³. The resulting powder with a solid content of 65-70% was dispersed in water.

100% Ceria (0.9 g/in³), magnesium acetate 4 hydrate (0.24 g/in³) and zirconium acetate (0.1 g/in³) were added to the Pt/Pd/Ba/Ce/alumina slurry. The subsequent slurry was milled to a particle size d90 of 11 μm. The final slurry is subsequently coated onto a ceramic flow through substrate. The coated substrate is dried at 110° C. air and calcined at 590° C. in air.

To prepare the second (top) layer of Sample 1.3, 0.65 g/in³ of a high porous γ-alumina material was firstly impregnated with a platinum solution with platinum as an amine stabilized hydroxo Pt IV complex to give a dry content of Pt 10 g/ft³. The resulting powder with a solid content of 55-60% was dispersed in water.

For Rh impregnation, 100% ceria material (1.4 g/in³) was dispersed into water to a solid content of 43%. A solution of Rh nitrate was added to the ceria slurry giving a final dry Rh content of 5 g/ft³.

The resulting Rh/Ceria slurry was added to the Pt/Pd/ alumina slurry. The subsequent slurry was milled to a particle size d90 of 8 μm. The final slurry is subsequently coated onto a ceramic flow through substrate. The coated substrate is dried at 110° C. air and calcined at 590° C. in air.

Sample 1.4 LNT (Inventive)

To prepare Sample 1.4, an embodiment of the present invention, 3.11 g/in³ of 50%/50% ceria/alumina material was impregnated with an aqueous solution of BaOAC (0.59 g/in³). The resulting powder was calcined at 590° C. for 2 hours resulting in a Ba/Ceria/alumina material with 16% BaO content.

The Ba/Ceria/alumina material was firstly impregnated with a platinum solution with platinum as an amine stabilized hydroxo Pt IV complex to give a dry content of Pt 72 g/ft³ and secondly with an aqueous solution of Palladium nitrate giving a final dry Pd content of 8 g/ft³. The resulting powder with a solid content of 70-75% was dispersed in water.

For Rh impregnation, 100% ceria material (0.7 g/in³) was dispersed into water to a solid content of 43%. A solution of Rh nitrate was added to the ceria slurry giving a final dry Rh content of 5 g/ft³.

For Ba impregnation on ceria, (1.52 g/in³) of 100% ceria material was impregnated with an aqueous solution of BaOAC (0.08 g/in³). The resulting powder was calcined at 590° C. for 2 hours resulting in a Ba/Ceria material with 5% BaO content.

The resulting Rh/Ceria slurry, Ba/Ceria material (1.6 g/in³), magnesium acetate 4 hydrate (0.3 g/in³) and zirconium acetate (0.05 g/in³) were added to the Pt/Pd/Ba/Ce/A1 alumina slurry. The subsequent slurry was milled to a particle size d90 of 9 μm. The final slurry is subsequently coated onto a ceramic flow through substrate. The coated substrate is dried at 110° C. air and calcined at 590° C. in air.

Sample 1.5 LNT (Inventive)

To prepare Sample 1.5, an embodiment of the present invention, 3.11 g/in³ of 50%/50% ceria/alumina material was impregnated with an aqueous solution of BaOAC (0.59 g/in³). The resulting powder was calcined at 590° C. for 2 hours resulting in a Ba/Ceria/alumina material with 16% BaO content.

The Ba/Ceria/alumina material was firstly impregnated with a platinum solution with platinum as an amine stabilized hydroxo Pt IV complex to give a dry content of Pt 72 g/ft³ and secondly with an aqueous solution of Palladium nitrate giving a final dry Pd content of 8 g/ft³. The resulting powder with a solid content of 70-75% was dispersed in water.

For Rh impregnation, 100% ceria material (0.7 g/in³) was dispersed into water to a solid content of 43%. A solution of Rh nitrate was added to the Ceria slurry giving a final dry Rh content of 5 g/ft³.

The resulting Rh/Ceria slurry, ceria (1.6 g/in³), magnesium acetate 4 hydrate (0.3 g/in³) and zirconium acetate (0.05 g/in³) were added to the Pt/Pd/Ba/Ce/A1 alumina slurry. The subsequent slurry was milled to a particle size d90 of 9 μm. The final slurry is subsequently coated onto a ceramic flow through substrate. The coated substrate is dried at 110° C. air and calcined at 590° C. in air.

Sample 1.6 LNT (Inventive)

To prepare Sample 1.6, an embodiment of the present invention, 3.7 g/in³ of 50%/50% ceria/alumina material was impregnated with an aqueous solution of BaOAC (0.7 g/in³). The resulting powder was calcined at 590° C. for 2 hours resulting in a Ba/Ceria/alumina material with 16% BaO content.

The Ba/Ceria/alumina material was firstly impregnated with a platinum solution with platinum as an amine stabilized hydroxo Pt IV complex to give a dry content of Pt 72 g/ft$^3$ and secondly with an aqueous solution of palladium nitrate giving a final dry Pd content of 8 g/ft$^3$. The resulting powder with a solid content of 70-75% was dispersed in water.

For Rh impregnation, 100% ceria material (0.7 g/in$^3$) was dispersed into water to a solid content of 43%. A solution of Rh nitrate was added to the ceria slurry giving a final dry Rh content of 5 g/ft$^3$.

For Ba impregnation on ceria, (0.855 g/in$^3$) of 100% Ceria material was impregnated with an aqueous solution of BaOAC (0.045 g/in$^3$). The resulting powder was calcined at 590° C. for 2 hours resulting in a Ba/Ceria material with 5% BaO content.

The resulting Rh/Ceria slurry, Ba/ceria material (0.9 g/in$^3$), magnesium acetate 4 hydrate (0.3 g/in$^3$) and zirconium acetate (0.05 g/in$^3$) were added to the Pt/Pd/Ba/Ce/Al alumina slurry. The subsequent slurry was milled to a particle size d90 of 9 µm. The final slurry is subsequently coated onto a ceramic flow through substrate. The coated substrate is dried at 110° C. air and calcined at 590° C. in air.

Sample 1.7 LNT (Inventive)

To prepare Sample 1.7, an embodiment of the present invention, 2.52 g/in$^3$ of 50%/50% ceria/alumina material was impregnated with an aqueous solution of BaOAC (0.48 g/in$^3$). The resulting powder was calcined at 590° C. for 2 hours resulting in a Ba/Ceria/alumina material with 16% BaO content.

The Ba/Ceria/alumina material was firstly impregnated with a platinum solution with platinum as an amine stabilized hydroxo Pt IV complex to give a dry content of Pt 72 g/ft$^3$ and secondly with an aqueous solution of palladium nitrate giving a final dry Pd content of 8 g/ft$^3$. The resulting powder with a solid content of 70-75% was dispersed in water.

For Rh impregnation, 100% ceria material (0.7 g/in$^3$) was dispersed into water to a solid content of 43%. A solution of Rh nitrate was added to the Ceria slurry giving a final dry Rh content of 5 g/ft$^3$.

For Ba impregnation on ceria, 2.19 g/in$^3$ of 100% ceria material was impregnated with an aqueous solution of BaOAC (0.115 g/in$^3$). The resulting powder was calcined at 590° C. for 2 hours resulting in a Ba/Ceria material with 5% BaO content.

The resulting Rh/Ceria slurry, Ba/ceria material (2.3 g/in$^3$), magnesium acetate 4 hydrate (0.3 g/in$^3$) and zirconium acetate (0.05 g/in$^3$) were added to the Pt/Pd/Ba/Ce/Al alumina slurry. The subsequent slurry was milled to a particle size d90 of 9 µm. The final slurry is subsequently coated onto a ceramic flow through substrate. The coated substrate is dried at 110° C. air and calcined at 590° C. in air.

World Light-Duty Harmonized Test Cycle (WLTC)—DeNOx, CO and HC Performance Evaluation Samples 1.3-1.7 were tested on an engine test cell with standard WLTC procedure. The test cell was equipped with a Euro 6 2 L engine. The average temperature in the first 1000 s of the WLTC cycles was 240° C. Prior to testing, the samples were aged in an oven for 16 hours at 800° C. under air flow with 10% water vapor. A rich engine mode was applied during the WLTC at 7 different positions in the cycle at Lambda 0.95 in order to regenerate the LNT from stored NOx. The NOx, CO and HC conversions over the LNT were measured. Higher conversions characterize a better gas activity. The NOx conversions downstream the inventive LNTs Samples 1.4-1.6 are significantly higher compared to the prior art LNT, Sample 1.3, as shown in Table 4. The LNTs with 5% Ba impregnated on ceria with a ratio of low temperature and high temperature storage material of 0.62 (Sample 1.4 and Sample 1.5) and 0.36 (Sample 1.6) show the highest conversions.

TABLE 4

Downstream emission after oven aged LNT of the 2$^{nd}$ WLTC (Emissions up-stream catalyst: NOx = 0.36 g/km; CO = 1.65 g/km; HC = 0.215 g/km)

| Sample | NOx Conversion/% | CO Conversion/% | HC Conversion/% |
| --- | --- | --- | --- |
| 1.3 LNT C | 58.1 | 96.2 | 78.1 |
| 1.4 LNT D | 81.9 | 98.4 | 83.7 |
| 1.5 LNT E | 73.1 | 98.7 | 83.7 |
| 1.6 LNT F | 81.4 | 98.4 | 81.9 |
| 1.7 LNT G | 70.0 | 98.5 | 83.3 |

Comparison to a Ba/Ceria LNT

TABLE 5

| Sample No. | Catalyst | PGM loading/ g/ft$^3$ (Pt/Pd/Rh) | Low T storage material | High T storage Material |
| --- | --- | --- | --- | --- |
| 1.8 | LNT H | 120 (103/12/5) | — | Ba on ceria |
| 1.9 | LNT I | 120 (103/12/5) | Ba on Ceria | Ba on 50% ceria/ 50% alumina |

Substrates 5.66*4.5" 400/4

Sample 1.8 Prior Art LNT

To prepare prior art Sample 1.8, 2.6 g/in$^3$ of high porous alumina doped with 15% MgO and 10% ceria was firstly impregnated with a platinum solution with platinum as an amine stabilized hydroxo Pt IV complex to give a dry content of Pt 103 g/ft$^3$ and secondly with an aqueous solution of palladium nitrate giving a final dry Pd content of 12 g/ft$^3$. The resulting powder with a solid content of 60-65% was dispersed in water.

For Rh impregnation high porous alumina doped with 20% zirconia (0.4 g/in$^3$) was impregnated with a solution of Rh nitrate (5 g/ft$^3$). The resulting powder was calcined at 590° C. for 2 hours resulting in a Rh/Zr/alumina material with 5 g/ft$^3$ Rh content.

The resulting Rh/Zr/alumina material, a material containing 20% BaO on 100% ceria material (3.45 g/in$^3$) and zirconium acetate (0.08 g/in$^3$) were added to the Pt/Pd/Mg/Ce/Al alumina slurry. The subsequent slurry was milled to a particle size d90 of 9 µm. The final slurry is subsequently coated onto a ceramic flow through substrate. The coated substrate is dried at 110° C. air and calcined at 590° C. in air.

Sample 1.9 LNT Inventive

To prepare Sample 1.9, an exemplary embodiment of the present invention, 3.07 g/in$^3$ of 50%/50% ceria/alumina material was impregnated with an aqueous solution of BaOAC (0.629 g/in$^3$). The resulting powder was calcined at 590° C. for 2 hours resulting in a Ba/Ceria/alumina material with 17% BaO content.

The Ba/Ceria/alumina material was then firstly impregnated with a platinum solution with platinum as an amine stabilized hydroxo Pt IV complex to give a dry content of Pt 103 g/ft$^3$ and secondly with an aqueous solution of palladium nitrate giving a final dry Pd content of 12 g/ft$^3$. The resulting powder with a solid content of 70-75% was dispersed in water.

For Rh impregnation, 100% Ceria material (0.7 g/in$^3$) was dispersed into water to a solid content of 43%. A solution of Rh nitrate was added to the Ceria slurry giving a final dry Rh content of 5 g/ft$^3$.

For Ba impregnation on Ceria, 1.52 g/in$^3$ of 100% Ceria material was impregnated with an aqueous solution of BaOAC (0.08 g/in$^3$). The resulting powder was calcined at 590° C. for 2 hours resulting in a Ba/Ceria material with 5% BaO content.

The resulting Rh/Ceria slurry, Ba/ceria material (1.6 g/in$^3$), magnesium acetate 4 hydrate (0.3 g/in$^3$) and zirconium acetate (0.05 g/in$^3$) were added to the Pt/Pd/Ba/Ce/Al alumina slurry. The subsequent slurry was milled to a particle size d90 of 9 μm. The final slurry is subsequently coated onto a ceramic flow through substrate. The coated substrate is dried at 110° C. air and calcined at 590° C. in air.

World Light-Duty Harmonized Test Cycle (WLTC)—DeNOx, CO and HC Performance Evaluation Samples 1.8 and 1.9 were tested on an engine test cell with standard WLTC procedure. The test cell was equipped with a Euro 6 2 L engine. The average temperature in the first 1000 s of the WLTC cycles was 230° C. Prior to testing, Samples 1.8 and 1.9 were aged for 5 hours at 800° C. under air flow with 10% water vapor. A rich engine mode was applied during the WLTC at 6 different positions in the cycle at Lambda 0.95 in order to regenerate the LNT from stored NOx. The NOx, CO and HC conversions over the LNT were measured. Higher conversions characterize a better gas activity. The NOx conversion downstream the inventive LNT (Sample 1.9) is significantly higher compared to the prior art LNT with 20% BaO on ceria (Sample 1.8) as shown in Table 6.

TABLE 6

Downstream emission after oven aged LNT of the 2$^{nd}$ WLTC (Emissions up-stream catalyst: NOx = 0.34 g/km; CO = 1.68 g/km; HC = 0.232 g/km)

| Sample | NOx Conversion/% | CO Conversion/% | HC Conversion/% |
|---|---|---|---|
| 1.8 LNT H | 75.5 | 98.5 | 81 |
| 1.9 LNT I | 82.5 | 98.5 | 82 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A lean NO$_x$ trap composition comprising:
   a washcoat layer on a carrier substrate including:
   a first support material comprising greater than 50% by weight of a reducible metal oxide;
   10 to 30% by weight of alkaline earth metal supported on a second support material comprising a refractory metal oxide and 50% or less by weight of a reducible metal oxide; and
   a platinum group metal component supported on at least one of the first support material and the second support material,
   wherein the second support and the first support are present in a ratio of 1:3 to 4:1 of the second support to first support.

2. The lean NO$_x$ trap composition of claim 1, wherein 0.5% to 10% by weight of alkaline earth metal is supported on a portion of the first support material.

3. The lean NO$_x$ trap composition of claim 2, wherein 3% to 6% by weight of alkaline earth metal supported on a portion of the first support material.

4. The lean NO$_x$ trap composition of claim 1, wherein the reducible metal oxide is one or more selected from the group consisting of CeO$_2$, MnO$_2$, Mn$_2$O$_3$, Fe$_2$O$_3$, CuO, and CoO.

5. The lean NO$_x$ trap composition of claim 1, wherein the first support material further comprises alumina.

6. The lean NO$_x$ trap composition of claim 1, wherein the first support material further comprises one or more dopants selected from the group consisting of oxides of Y, Nd, Sm, La, Zr, Nb and Pr.

7. The lean NO$_x$ trap composition of claim 1, wherein the alkaline earth metal is barium oxide.

8. The lean NO$_x$ trap composition of claim 7, wherein 1% to 7% by weight of barium oxide is supported on the first support.

9. The lean NO$_x$ trap composition of claim 8, wherein the loading of the barium oxide and the first support is present in the range of 0.1 to 2 g/in$^3$.

10. The lean NO$_x$ trap composition of claim 7, wherein the loading of the barium oxide and the second support is present in the range of 1 to 4 g/in$^3$.

11. The lean NO$_x$ trap composition of claim 1, wherein the first support material comprises 100% by weight ceria.

12. The lean NO$_x$ trap composition of claim 1, wherein the second support material consists essentially of ceria and alumina.

13. The lean NO$_x$ trap composition of claim 12, wherein the second support material comprises 20-50% by weight ceria and 50-80% by weight alumina.

14. The lean NO$_x$ trap composition of claim 12, wherein the ceria and alumina are present in a ratio of 30:70 of ceria to alumina.

15. The lean NO$_x$ trap composition of claim 12, wherein the ceria and alumina are present in a ratio of 50:50 of ceria to alumina.

16. The lean NO$_x$ trap composition of claim 1, wherein the platinum group metal component includes one or more selected from the group consisting of Rh, Pt and Pd.

17. The lean NO$_x$ trap composition of claim 16, further comprising a third support material comprising a refractory metal oxide and 50% or less by weight of a reducible metal oxide.

18. The lean NO$_x$ trap composition of claim 17, wherein the refractory metal oxide is alumina.

19. The lean NO$_x$ trap composition of claim 16, wherein the platinum group metal component includes Pt and Pd.

20. The lean $NO_x$ trap composition of claim 19, wherein Pt is present in a range of 20 to 200 g/ft$^3$, Pd is present in a range of 1 to 50 g/ft$^3$, and the ratio of Pt to Pd is in the range of 15:1 to 2:1.

21. The lean $NO_x$ trap composition of claim 20, wherein the ratio of Pt to Pd is in the range of 10:1 to 4:1.

22. The lean $NO_x$ trap composition of claim 19, wherein the platinum group metal component further comprises rhodium present in a range of 1 to 20 g/ft$^3$ on a portion of the first support.

23. The lean $NO_x$ trap composition of claim 1, wherein 100% of the platinum group metal component is on the second support and the platinum group metal component comprises Pt and Pd.

24. The lean $NO_x$ trap composition of claim 1, wherein the platinum group metal component comprises Pt and Pd, and wherein 50-100% by weight of the Pd is on the first support.

25. The lean $NO_x$ trap composition of claim 1, wherein the platinum group metal component comprises Pt and Pd, and wherein 2-10% by weight of the Pt is on the first support.

26. The lean $NO_x$ trap composition of claim 1, wherein the second support and the first support are present in a ratio of 1:2 to 3:1 of the second support to first support.

27. The lean $NO_x$ trap composition of claim 1, wherein the refractory metal oxide of the second support is doped with one or more selected from the group consisting of an oxide of Mg, an oxide of Mn and an oxide of Zr.

28. The lean $NO_x$ trap composition of claim 27, wherein the refractory metal oxide is doped with an oxide of Mg and Zr.

29. An exhaust gas system for a lean burn internal combustion engine comprising the lean $NO_x$ trap composition of claim 1, wherein the system further comprises a downstream selective catalytic reduction (SCR) catalyst.

30. The exhaust gas system of claim 29, wherein the lean $NO_x$ trap composition is disposed as a washcoat on a substrate and the SCR catalyst is disposed as a separate washcoat layer on a separate downstream substrate.

31. The exhaust gas system of claim 30, wherein lean $NO_x$ trap composition is on a honeycomb flow through substrate and the SCR catalyst is on a wall flow substrate.

32. The exhaust gas system of claim 30, wherein lean $NO_x$ trap composition is on a wall flow substrate and the SCR catalyst is on a honeycomb flow through substrate.

33. A lean $NO_x$ trap composition comprising:
a washcoat layer on a carrier substrate including:
a first support material comprising greater than 50% by weight of a reducible metal oxide;
10 to 20% by weight of alkaline earth metal supported on a second support material comprising a refractory metal oxide and 50% or less by weight of a reducible metal oxide;
a platinum group metal component supported on a third support material comprising greater than 50% by weight of a reducible metal oxide; and
a platinum group metal component supported on a fourth support material comprising a refractory metal oxide and 50% or less by weight of a reducible metal oxide.

34. The lean $NO_x$ trap composition of claim 33, wherein a platinum group metal is present on a portion of the first support material.

35. The lean $NO_x$ trap composition of claim 34, wherein the platinum group metal on a portion of the first support material is rhodium.

36. The lean $NO_x$ trap composition of claim 35, wherein rhodium is present in a range of 1 to 20 g/ft$^3$.

37. The lean NOx trap composition of claim 33, wherein the third support comprises one or more selected from the group consisting of $Al_2O_3$ and $ZrO_2$, and wherein the reducible metal oxide is one or more selected from the group consisting of $CeO_2$, $MnO_2$, $Mn_2O_3$, $Fe_2O_3$, CuO, and CoO.

38. The lean NOx trap composition of claim 37, wherein the third support comprises one or more selected from the group consisting of $CeO_2$, $Al_2O_3$, and $ZrO_2$.

39. The lean $NO_x$ trap composition of claim 33, wherein the first support material comprises 100% by weight ceria.

40. The lean $NO_x$ trap composition of claim 33, wherein the alkaline earth metal supported on the second support is barium oxide.

41. The lean NOx trap composition of claim 33, wherein the platinum group metal component supported on the third support material is rhodium.

42. The lean NOx trap composition of claim 41, wherein rhodium on the third support is present in a range of 1 to 20 g/ft$^3$.

43. The lean NOx trap composition of claim 42, wherein rhodium is present in a range of 3 to 7 g/ft$^3$.

44. The lean NOx trap composition of claim 33, wherein the fourth support comprises one or more selected from the group consisting of $CeO_2$, $Al_2O_3$, and $ZrO_2$.

45. The lean NOx trap composition of claim 44, wherein the platinum group metal component supported on the fourth support material comprises Pt and Pd.

46. The lean $NO_x$ trap composition of claim 33, wherein the refractory metal oxide of the fourth support is doped with one or more selected from the group consisting of an oxide of Mg, an oxide of Mn and an oxide of Zr.

47. A method of treating exhaust gas from a lean burn internal combustion engine, the method comprising contacting lean exhaust gas containing nitric oxide with the lean $NO_x$ trap composition according to claim 1, and intermittingly contacting the lean $NO_x$ trap composition with enriched exhaust gas.

48. A method of treating exhaust gas from a lean burn internal combustion engine, the method comprising contacting lean exhaust gas containing nitric oxide with the lean $NO_x$ trap composition according to claim 33, and intermittingly contacting the lean $NO_x$ trap composition with enriched exhaust gas.

* * * * *

UNITED STATES PATENT AND TRADEMARK OFFICE
CERTIFICATE OF CORRECTION

PATENT NO. : 10,226,754 B2
APPLICATION NO. : 15/555142
DATED : March 12, 2019
INVENTOR(S) : Gerd Grubert et al.

Page 1 of 1

It is certified that error appears in the above-identified patent and that said Letters Patent is hereby corrected as shown below:

On the Title Page

Column 2, item (56), Foreign Patent documents:
"DE 10 2012 20452" should read -- DE 10 2012 204524 --.

Signed and Sealed this
Fourteenth Day of April, 2020

Andrei Iancu
*Director of the United States Patent and Trademark Office*